(12) United States Patent
Satou et al.

(10) Patent No.: US 9,128,734 B2
(45) Date of Patent: Sep. 8, 2015

(54) MENU SCREEN FOR AN OPERATION MONITORING APPARATUS

(75) Inventors: Takashi Satou, Musashino (JP); Norikatsu Kataoka, Musashino (JP)

(73) Assignee: YOKOGAWA ELECTRIC CORPORATION, Tokyo (JP)

(*) Notice: Subject to any disclaimer, the term of this patent is extended or adjusted under 35 U.S.C. 154(b) by 1075 days.

(21) Appl. No.: 12/968,932

(22) Filed: Dec. 15, 2010

(65) Prior Publication Data

US 2011/0145767 A1    Jun. 16, 2011

(30) Foreign Application Priority Data

Dec. 16, 2009  (JP) ................................ 2009-285177

(51) Int. Cl.
  *G06F 3/0482*  (2013.01)
  *G06F 9/44*    (2006.01)

(52) U.S. Cl.
  CPC ............ *G06F 9/4443* (2013.01); *G06F 3/0482* (2013.01)

(58) Field of Classification Search
  None
  See application file for complete search history.

(56) References Cited

U.S. PATENT DOCUMENTS

| | | | | |
|---|---|---|---|---|
| 5,345,550 A | * | 9/1994 | Bloomfield | 715/841 |
| 5,581,685 A | * | 12/1996 | Sakurai | 715/841 |
| 5,625,783 A | * | 4/1997 | Ezekiel et al. | 719/320 |
| 5,664,133 A | | 9/1997 | Malamud et al. | |
| 5,784,583 A | * | 7/1998 | Redpath | 715/841 |
| 5,805,167 A | * | 9/1998 | van Cruyningen | 715/808 |
| 6,067,087 A | * | 5/2000 | Krauss et al. | 715/762 |
| 6,307,574 B1 | * | 10/2001 | Ashe et al. | 715/765 |
| 6,590,596 B1 | * | 7/2003 | Rector | 715/810 |
| 6,762,777 B2 | * | 7/2004 | Carroll | 715/808 |
| 7,254,784 B2 | * | 8/2007 | Chang | 715/810 |
| 2002/0163544 A1 | * | 11/2002 | Baker et al. | 345/835 |
| 2003/0076358 A1 | * | 4/2003 | Nakajima et al. | 345/765 |

(Continued)

FOREIGN PATENT DOCUMENTS

JP    2006-031301 A    2/2006

OTHER PUBLICATIONS

Bastian et al., "Desktop Menu Specification," Sep. 17, 2008, https://web.archive.org/web/20080917003610/http://standards.freedesktop.org/menu-spec/menu-spec-1.0.html.*

(Continued)

*Primary Examiner* — Matt Kim
*Assistant Examiner* — Ryan Barrett
(74) *Attorney, Agent, or Firm* — Westerman, Hattori, Daniels & Adrian, LLP (57) ABSTRACT

An operation monitoring apparatus capable of displaying right click menus varying in configuration from each other according to a select object on an operation-monitoring screen is realized. The operation monitoring apparatus comprises an object file holding means for holding a plurality of individual menu definition files registered under object names, respectively, having menu items defined on an object-by-object basis, in an object displayed on an operation-monitoring screen, the object being a target for display on a right click menu screen, a retrieval means for acquiring information on the object name of the object subjected to right click on the operation-monitoring screen, and retrieving the object file holding means 300, thereby extracting the individual menu definition file registered under the object name, and a screen display means for acquiring information on the individual menu definition file as extracted, and displaying the right click menu screen on the operation-monitoring screen.

6 Claims, 8 Drawing Sheets

(56) References Cited

U.S. PATENT DOCUMENTS

| | | | |
|---|---|---|---|
| 2003/0078956 A1* | 4/2003 | Ravichandran et al. | 709/107 |
| 2003/0174174 A1* | 9/2003 | Fitzpatrick et al. | 345/809 |
| 2006/0190842 A1* | 8/2006 | Young Suk Lee | 715/810 |
| 2007/0050468 A1* | 3/2007 | Gazit | 709/217 |
| 2007/0094597 A1* | 4/2007 | Rostom | 715/700 |
| 2007/0162898 A1* | 7/2007 | Ramani et al. | 717/135 |
| 2007/0240069 A1* | 10/2007 | Eldridge et al. | 715/763 |
| 2008/0148191 A1* | 6/2008 | Weinlander | 715/854 |
| 2008/0163260 A1* | 7/2008 | Lin et al. | 719/320 |
| 2008/0229232 A1* | 9/2008 | Schulz et al. | 715/781 |
| 2009/0228831 A1* | 9/2009 | Wendker et al. | 715/808 |
| 2010/0088343 A1* | 4/2010 | Goldberg et al. | 707/791 |
| 2010/0122194 A1* | 5/2010 | Rogers | 715/769 |
| 2010/0205547 A1* | 8/2010 | Boegelund et al. | 715/760 |

OTHER PUBLICATIONS

Campbell, "XML, API, CSV, SOAP! Understanding the Alphabet Soup of Data Exchange," Oct. 2007, http://www.idealware.org/articles/data_exchange_alpha_soup.php.*

Natural Docs, "Organizing the Menu," Oct. 28, 2007, https://web.archive.org/web/20071028091352/http://www.naturaldocs.org/menu.html.*

Adam, "Re: Customize the right click menu," Jun. 24, 2009, http://cutesoft.net/forums/thread/53476.aspx.*

Yuen et al. "Integrating existing software with GNOME," 2006, https://developer.gnome.org/integration-guide/stable/index-info.html.en.*

Microsoft, "Visual Studio Application Settings," Nov. 2007, https://web.archive.org/web/20080915053011/http://msdn.microsoft.com/en-us/library/a65txexh.aspx.*

Leon, "Simple File Based Application Configuration," Mar. 1, 2008, http://onsmalltalk.com/simple-file-based-application-configuration.*

"Context menu", Wikipedia, Nov. 26, 2009, XP002636025, Retrived from the Internet:URL:http://en.wikipedia.org/w/index.php/title=Context_menu&oldid=328070362&printable=yes[retrieved on May 10, 2011]. (cited in European Search Report dated Jun. 6, 2011).

European Search Report dated Jun. 6, 2011, issued in corresponding European Patent Application No. 10015578.7.

Office Action dated Jul. 16, 2014, issued in corresponding Chinese Patent Application No. 201010600597.5 (4 pages).

* cited by examiner

MENU SCREEN FOR AN OPERATION MONITORING APPARATUS

This application claims priority from Japanese Patent Application No. 2009-285177, filed on Dec. 16, 2009, the entire contents of which are herein incorporated by reference.

BACKGROUND

1. Technical Field

The present invention relates to a method of displaying a menu screen (hereinafter referred to as a right click menu screen) popping up upon right click (under Windows) executed in an object or a tag (hereinafter referred to as an object), displayed on an operation monitoring screen of an operation monitoring apparatus of a process control system.

2. Related Art

With a related-art operation monitoring apparatus, when a mouse cursor is tapped on a part of an operation monitoring screen, at a specific location where an object is allocated (a location where the mouse cursor appears in the shape of a hand), and right click is executed, a right click menu screen is displayed, thereby enabling a function such as a call for a related screen, and so forth.

Figure 8:
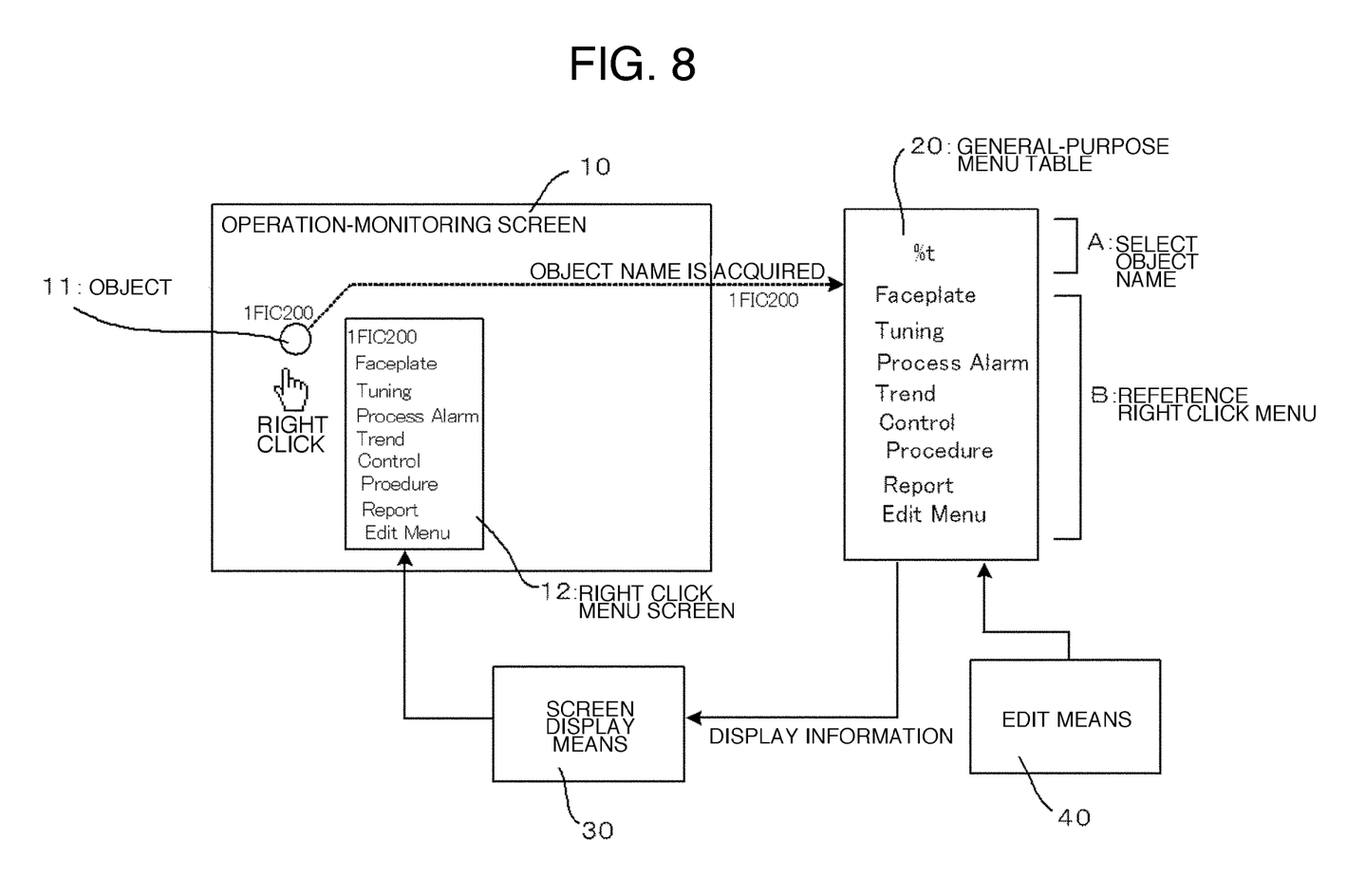
FIG. 8 is a function block diagram showing a method for displaying a related-art right click menu screen.

FIG. 8 is a function block diagram showing a method for displaying a related-art right click menu screen. A right click menu screen 12 is displayed by execution of right click on an object 11 (tag name: IFIC200) allocated to an operation-monitoring screen 10.

The object name (tag name: IFIC200) allocated to a location where right click is executed is notified to a general-purpose menu table 20. Definition contents of the general-purpose menu table 20 are comprised of description A that substitutes for a select object name, and description B of a reference right click menu.

The general-purpose menu table 20 generates information on a right click menu having substituted for the object 11 (tag name: IFIC200) as acquired and the information is delivered as display information to a screen display means 30. The screen display means 30 displays the right click menu screen 12 on the operation-monitoring screen 10.

The description B of the reference right click menu is limited to general-purpose information-providing service in common with a multitude of objects, and is not organized to support service for providing detailed information varying on an object-by-object basis.

The contents of the right click menu described on the general-purpose menu table 20 can be partially edited by an operator via an edit means 40. Edit contents include addition•deletion•change, and so forth, as for menu items.

At this point in time, display contents dependent on a select object can be displayed by use of special keywords shown in the following table. The special keywords are expression of symbols for use in substituting for object names in the process of selection, comments on the object names, and so forth during display of the menu or execution thereof.

Special Keyword Table

| special keyword | described in menu display items | described in execution command definitions |
|---|---|---|
| only null character (" "), or white space | menu items are not displayed | menu items are displayed, but the items undergo gray-out |
| =(one character only) | A separator is displayed. Definition contents of an execution command unit are nullified. No definition for a parent hierarchy having a child hierarchy | No execution even if selected although displayed in a menu. |
| %t | Replaced only when an object in the process of selection is a tag name. Treated as a null character if the object is other than the tag name (a menu item is not displayed). | Replaced only when an object in the process of selection is a tag name. Treated as a null character if the object is other than the tag name (a menu item undergoes gray-out). |
| %w | Replaced with an object name in the process of selection. | Replaced with an object name in the process of selection. |
| %c | Replaced with a tag name in the process of selection, and comment on a screen name. If the comment is not defined, replaced with an object name in the process of selection (the same action as that of %w). | It is not authorized to define a special keyword. In case the special keyword is defined, the same treatment as the case of a null character applies (a menu item undergoes gray-out). |

RELATED ART LITERATURE

Patent Document

JP2006-031301-A

The right click menu adopted on the operation-monitoring screen of the related-art operation monitoring apparatus can implement partial display dependent on a select object by use of a special keyword, however, since a configuration of the right click menu is always the same regardless of the object to be selected, it is not possible to display a highly flexible dynamic menu according to an object in the process of selection.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any disadvantages.

It is one of illustrative aspects of the present invention to provide an operation monitoring apparatus capable of displaying right click menus varying in configuration from each other according to a select object on an operation-monitoring screen.

According to one or more illustrative aspects of the invention, there is provided an operation monitoring apparatus comprising an object file holding means for holding a plurality of individual menu definition files registered under object names, respectively, having menu items defined on an objectby-object basis, in an object displayed on an operation-monitoring screen, the object being a target for display on a right click menu screen, a retrieval means for acquiring information on the object name of an object subjected to right click on the operation-monitoring screen, and retrieving an object file holding means, thereby extracting an individual menu definition file registered under the object name, and a screen display means for acquiring information on the individual menu definition file as extracted, and displaying the right click menu screen on the operation-monitoring screen.

DETAILED DESCRIPTION OF EXEMPLARY EMBODIMENTS

Figure 1:
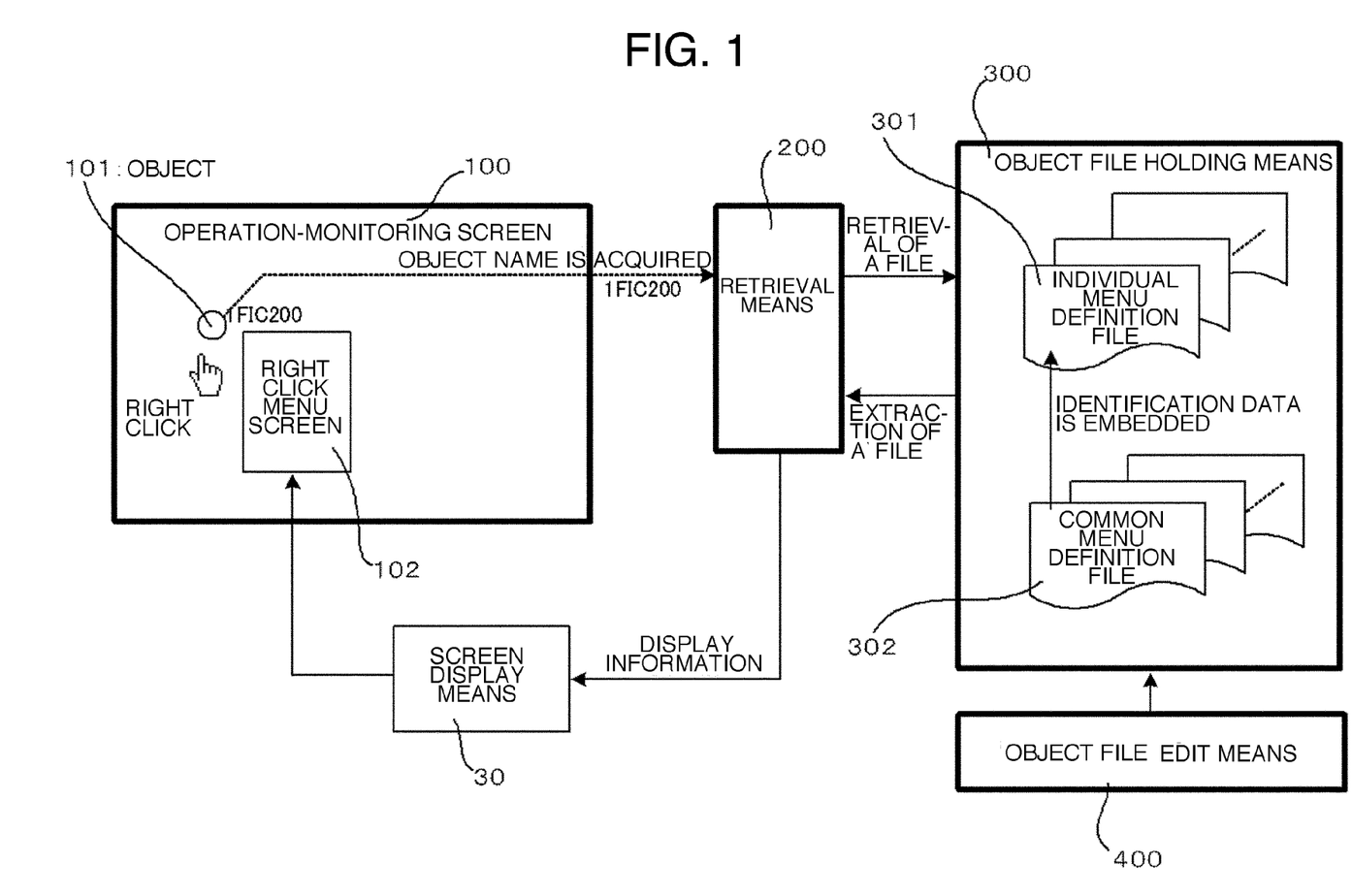
FIG. 1 is a functional block diagram showing one embodiment of a method of displaying a right click menu screen of an operation monitoring apparatus, according to the present invention.

The present invention is described in detail hereinafter with reference to the accompanying drawings. FIG. 1 is a functional block diagram showing one embodiment of a method of displaying a right click menu screen of an operation monitoring apparatus, according to the present invention. In the figure, elements identical to those of the related-art configuration that are described with reference to FIG. 8 are each denoted by a like reference numeral, thereby omitting description thereof.

In FIG. 1, upon execution of right click of an object 101 on an operation-monitoring screen 100 of an operation monitoring apparatus according to the present invention, an object name of the object 101 is delivered to a retrieval means 200.

The retrieval means 200 retrieves an individual menu definition file 301 of an object file holding means 300, and a common menu definition file 302 that is the same as the individual menu definition file 301 except that identification data is embedded and described therein, by making use of an object name acquired as a key, thereby extracting a file wherein the object name is in agreement with an identification data of the common menu definition file, whereupon display information of the file is notified to a screen display means 30.

The screen display means 30 displays a right click menu screen 102 on the operation-monitoring screen 100 on the basis of the display information acquired from the retrieval means 200. A right click menu unique to the object 101 as selected is displayed on the right click menu screen 102 displayed at this point in time.

The individual menu definition file 301 of the object file holding means 300 is made up of a plurality of definition files edited on an object-by-object basis, and object names are affixed to the respective definition files, serving as respective file names.

Figure 2:
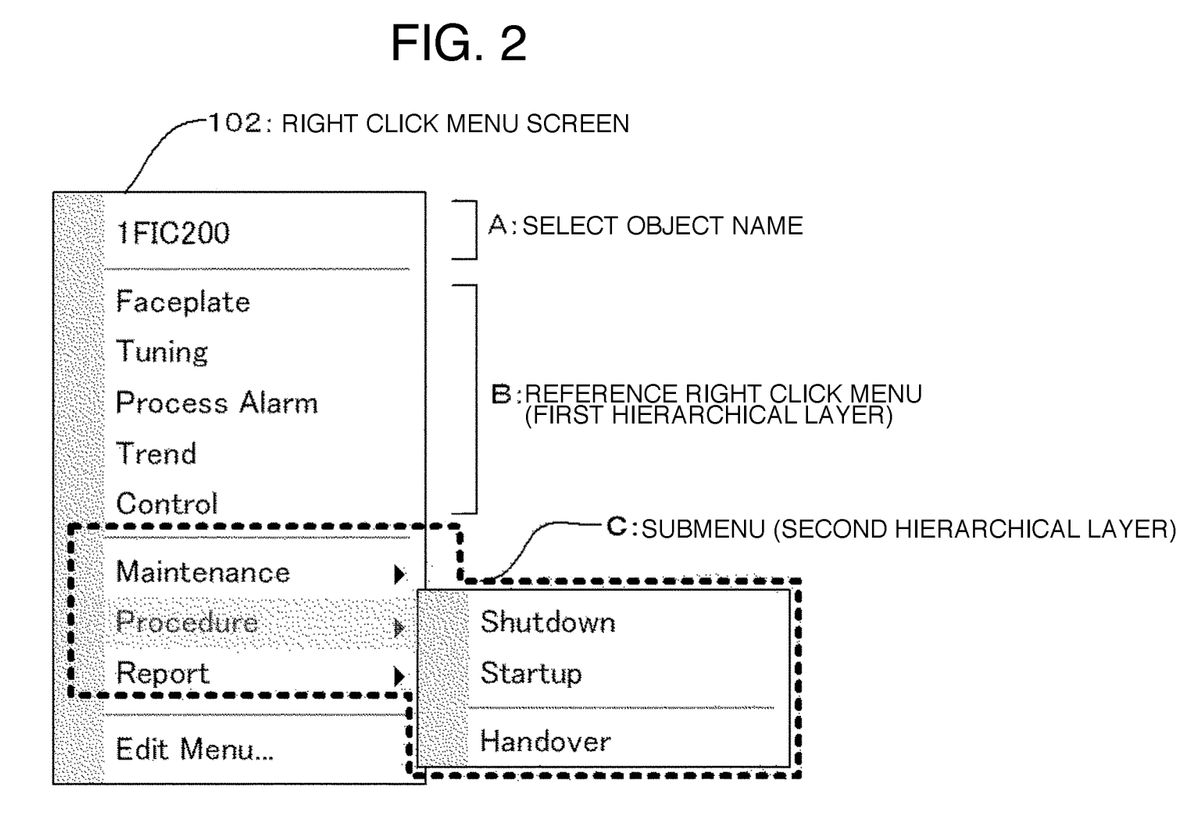
FIG. 2 is a view showing a display example of the right click menu screen according to the present invention.

FIG. 2 is a view showing a display example of the right click menu screen 102 according to the present invention. The menu is of a hierarchical structure wherein a reference right click menu B in a first hierarchical layer is displayed after a select object name A, and further, a submenu C is displayed in a second hierarchical layer.

The reference right click menu B is identical to the general-purpose menu in common with all the objects, as explained with reference to FIG. 8 for describing the related-art method, and the submenu C corresponds to the right click menu unique to the select object IFIC200 in FIG. 8.

Figure 3:
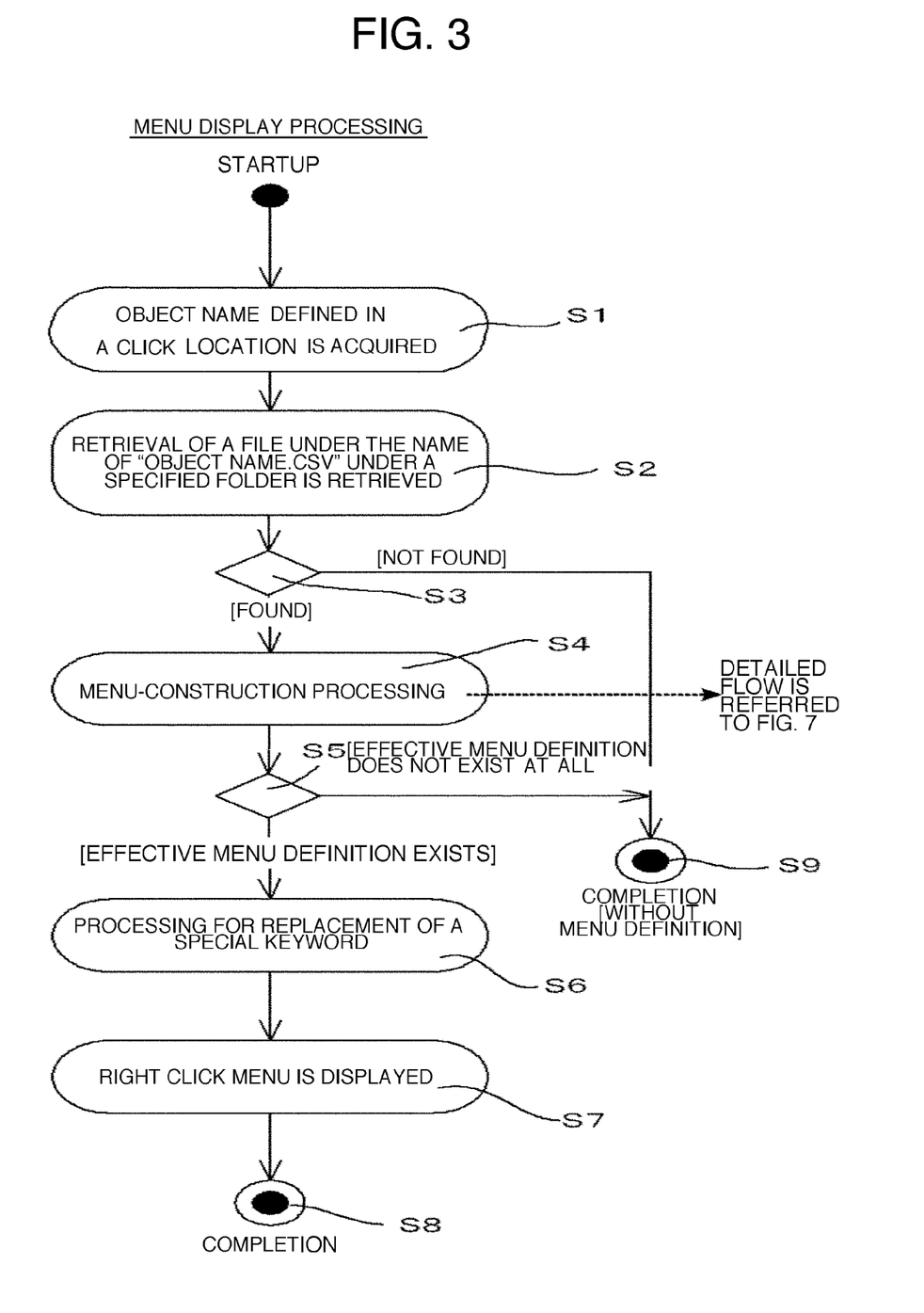
FIG. 3 is a flow chart showing a procedure for displaying the right click menu screen according to the present invention.

FIG. 3 is a flow chart showing a procedure for displaying the right click menu screen according to the present invention. Upon startup of processing, the retrieval means 200 acquires an object name allocated to a right click location on the right click menu screen 102 to be defined (step S1).

In step S2, the retrieval means 200 executes retrieval of a file under the name of "object name.csv" under a specified folder of the object file holding means 300. If the file is found during a branching processing in step S3, the processing proceeds to step S4 where a menu-construction processing is executed. The menu-construction processing will be described in detail with reference to FIG. 7 later on.

If an effective menu definition exists in a branching processing in step S5, the processing proceeds to step S6 where processing for replacement of a special keyword is executed, and the right click menu is displayed in step S7, thereby completing the processing in step S8. If a file in agreement with the file under the name of "object name.csv" is not found in the branching processing in the step S3, and if the effective menu definition does not exist in the branching processing in step S5, the processing is completed without menu definition (step S9).

Figure 4:
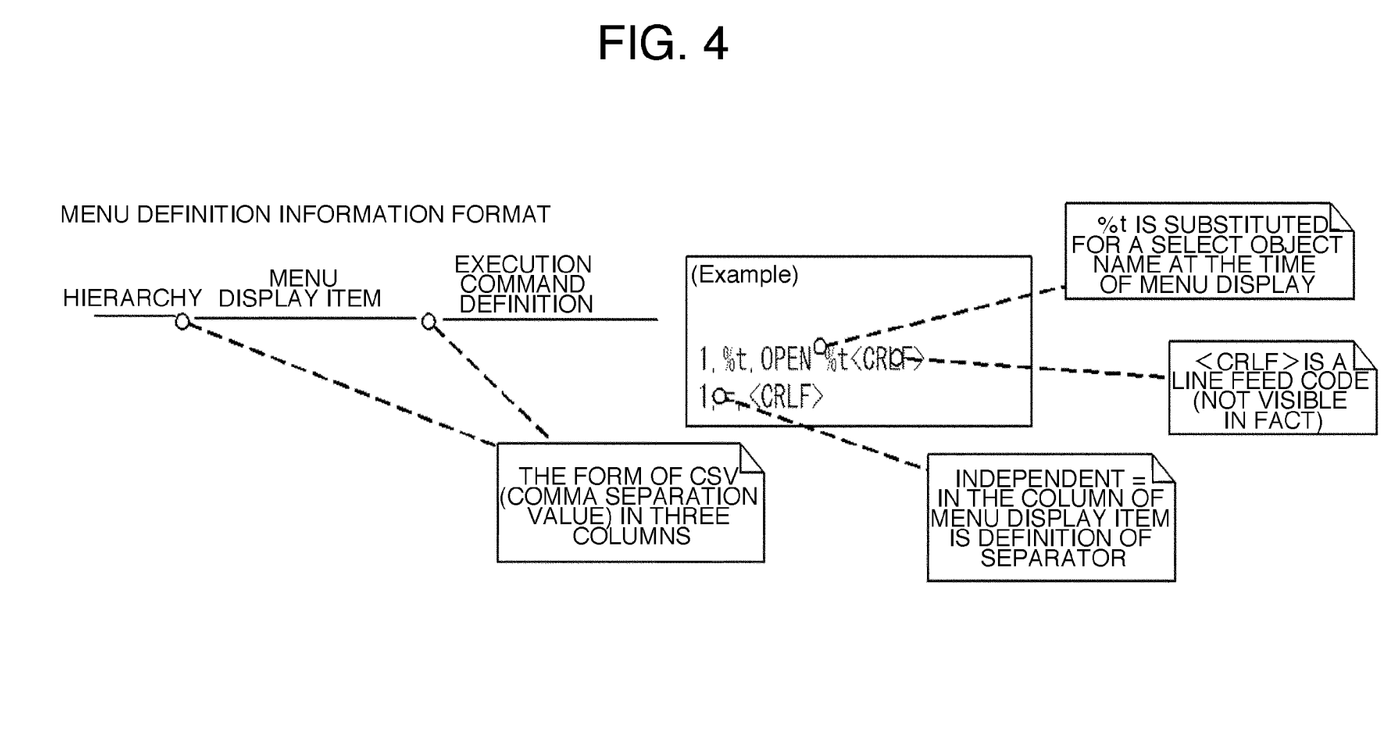
FIG. 4 is a view showing an example of a menu definition information format according to the present invention.

FIG. 4 shows an example of a menu definition information format according to the present invention. Menu information necessary for executing a menu selected by displaying the right click menu is expressed by a character string record in the form of CSV (comma separation value) in three columns, comprising hierarchy, menu display item, and execution command definition, per one menu item. The following table shows items in the respective columns, and explanation about the contents thereof.

| column | item | contents |
|---|---|---|
| 1 | hierarchy (numerical value) | To designate hierarchy No. A set value is in a range of 0-2. To ignore other values if set. If 0 is set, the second column is assumed as a common menu definition file name. (refer to "common definition" described later) |
| 2 | menu display item (character string) | Upon right click, character string displayed as a menu |

-continued

| column | item | contents |
|---|---|---|
| | | item is designated. If 0 is designated in the first column, a common menu definition file name (an extension is omitted) is defined. A special keyword is supported as is the case with related-art technologies. |
| 3 | execution command definition (character string) | A command for start of a program, a call for a screen, and so forth, to be executed upon selection of a menu, is designated (with CENTIUM VP, use is made of an unique format called functional character string, but details of the format is omitted). As is the case with related-art technologies, a special keyword is supported. |

A menu definition file described in a predetermined format is one file against one object, and an object name+extension (".csv") is affixed to the file. For example, a definition file name against a tag IFIC200 is IFIC200.csv. A group of these CSV files are all preserved under a specified folder.

When the retrieval means 200 has acquired an object name, the retrieval means 200 retrieves a CSV file having an object name designated under a predetermined folder by use of the function of a standard file system mounted on an operating system without use of a commercial database system and so forth. By so doing, a right click menu function can be realized with low cost.

A PC of the latest model has a performance such that even if a CSV file having a specific object name is retrieved out of several tens of thousands of files, the PC can attain retrieval in about 100 ms, and is equipped with sufficient retrieval capability for display of the right click menu careen.

Figure 5:
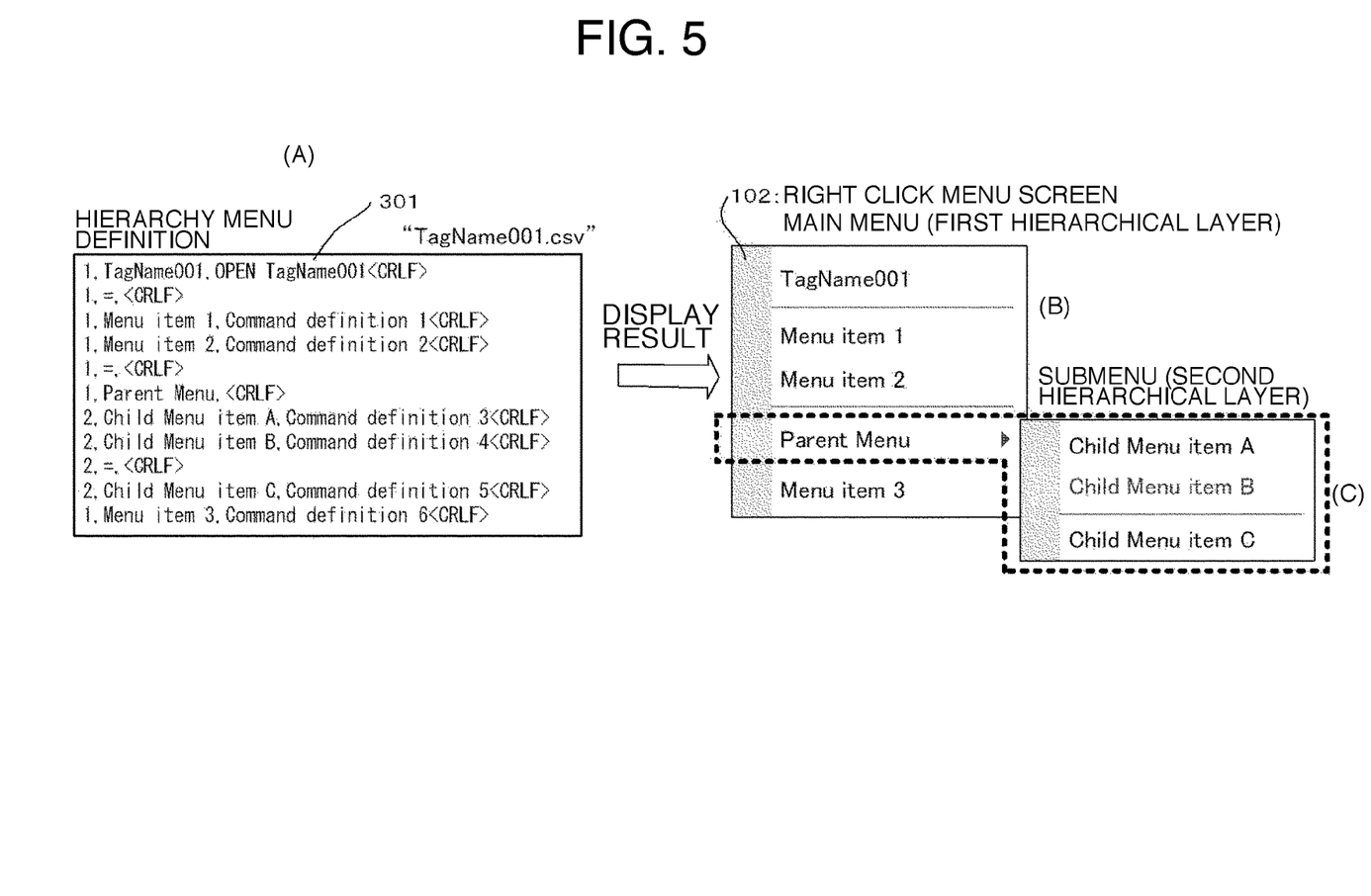
FIG. 5 is a view showing an example of description of a hierarchy menu definition file according to the present invention, and an example of display of the screen thereof.

FIG. 5 is a view showing an example of description of a hierarchy menu definition file according to the present invention, and an example of display of the screen thereof. In a hierarchy menu definition file (A) having an object name TagName001.csv, Parent Menu as the main menu in a first hierarchical layer is described, being followed by Child Menu items A, B, C, in a second hierarchical layer.

The display result of the right click menu screen of the hierarchy menu definition file (A) having an object name TagName001.csv shows that the main menu in the first hierarchical layer is displayed in (B), and submenu in the second hierarchical layer is displayed in (C).

Figure 6:
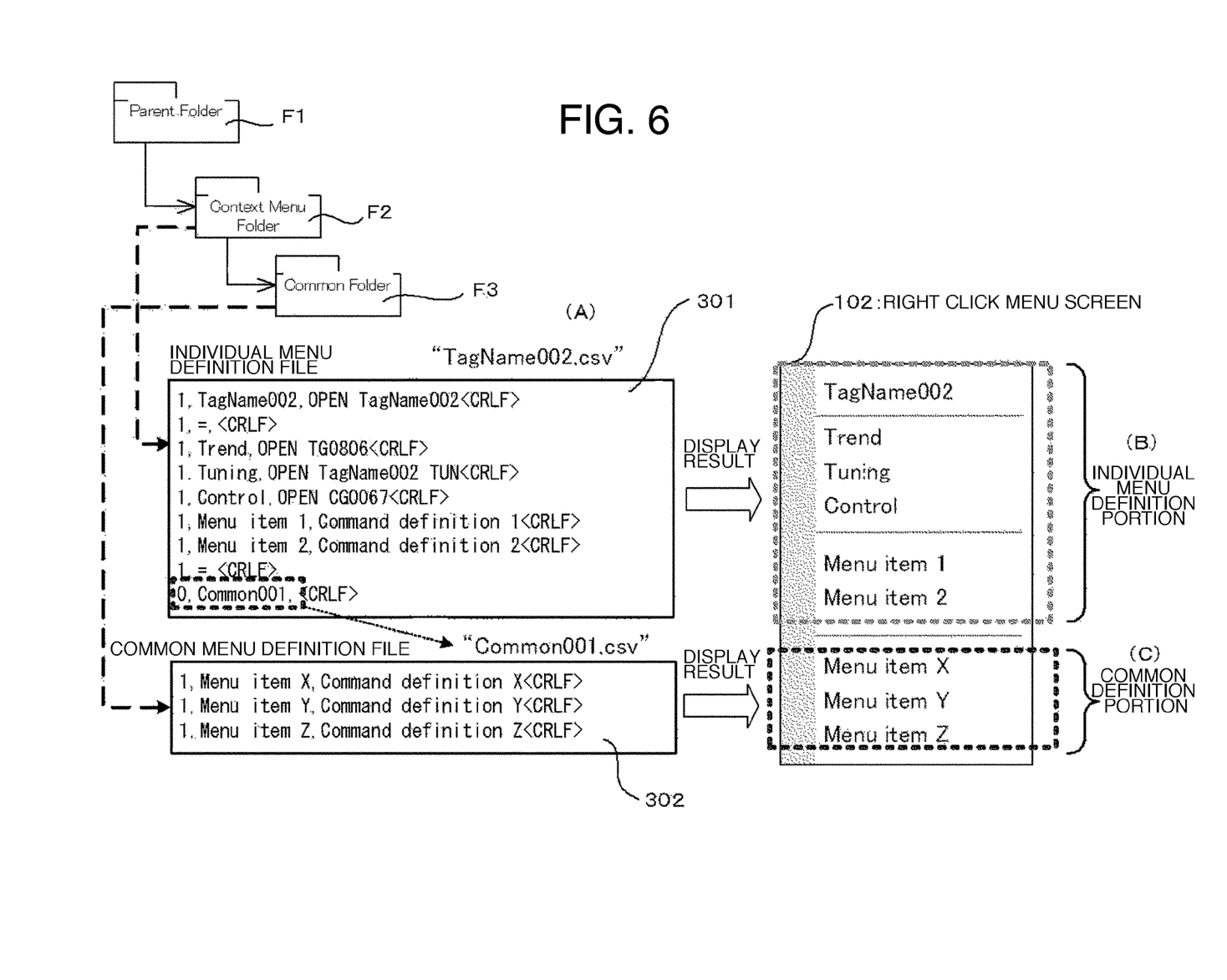
FIG. 6 is a view showing an example of description of an individual menu definition file and a common menu definition file, according to the present invention, and examples of the displays of the respective screen thereof.

FIG. 6 is a view showing an example of description (A) of the individual menu definition file and the common menu definition file, according to the present invention, and examples of displays (B), (C) of the respective screen thereof. The common menu definition can be designated by describing "0" in the hierarchy in the column 1.

The common menu definition is definition shared by a plurality of menus. Accordingly, all the menus referred to can be concurrently changed by changing the common menu definition. A unique identification data, for example, Common001.csv, is affixed to the common menu definition file as well to be preserved under a predetermined folder.

As shown in (A) of FIG. 6, a lower-level Context Folder F2 is placed below a higher-level Parent Folder F1, and further, a Common Folder F3 is placed below the Context Folder F2, whereupon the individual menu definition file 301 is preserved under the Context Folder F2, and the common menu definition file 302 is preserved under the Common Folder F3.

An individual menu definition file having an object name TagName002.csv is provided with description where a common menu definition file (file name: Common001.csv) having "0" in the hierarchy, and menu items X, Y, Z, is embedded in the lowest line. The retrieval means 200, upon detection of this description, retrieves the common menu definition file under the Common Folder F3, and extracts a common menu file having a file name Common001 to be delivered to the screen display means 30.

Menu items of an individual definition portion of the individual menu definition file are displayed in a front-stage (B) of the right click menu screen 102 displayed on the operation-monitoring screen 100, and the menu items X, Y, Z of a common definition portion of the common menu definition file are displayed in a subsequent-stage (C) of the right click menu screen 102.

Figure 7:
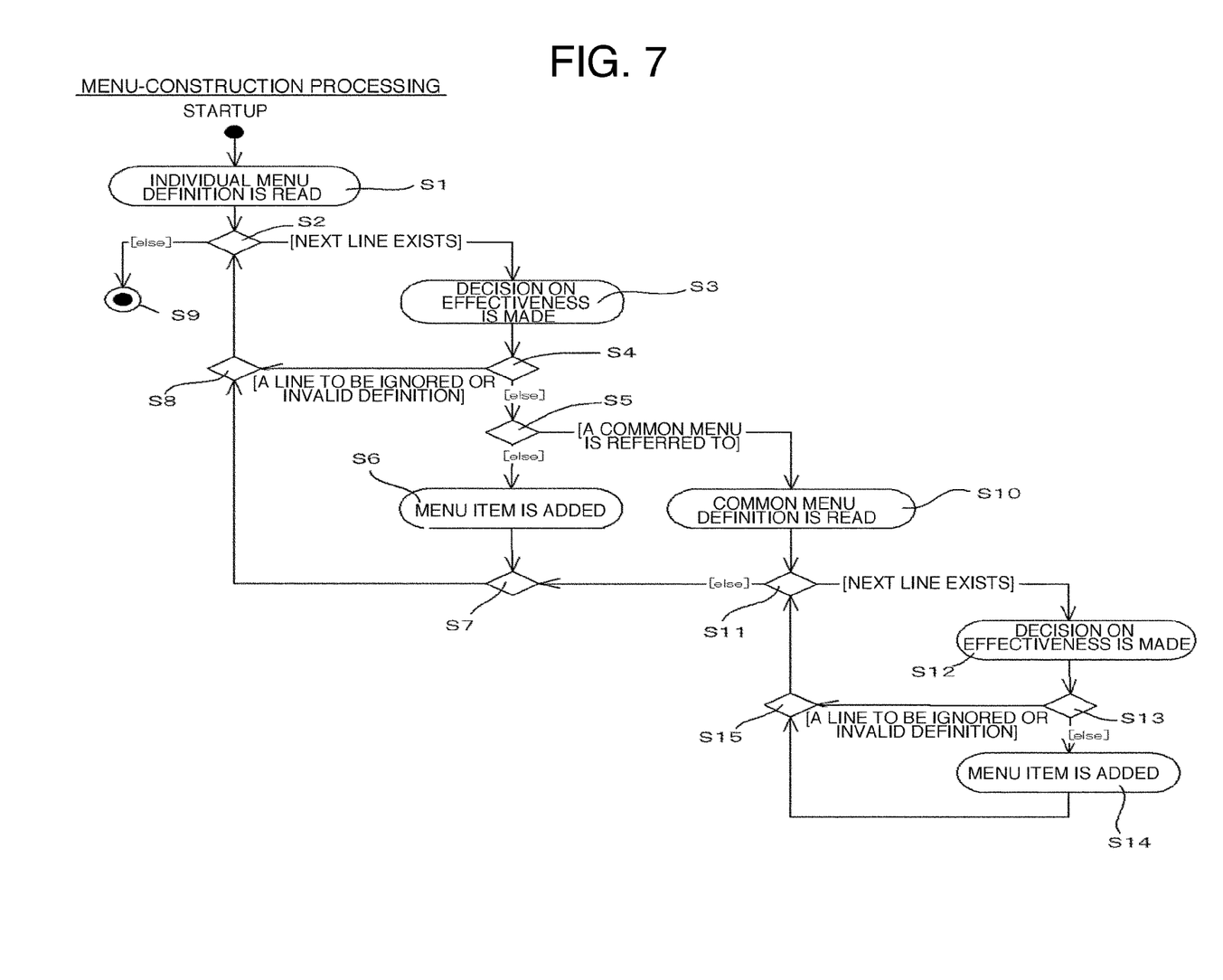
FIG. 7 is a flow chart showing a detailed procedure for a menu-construction processing according to the present invention.

FIG. 7 is a flow chart showing a detailed procedure for the menu-construction processing according to the present invention, shown in the step S4 of FIG. 3. Upon startup of the processing, an individual menu definition is read in step S1, and if a next line exists in menu definition during a branching processing in step S2, the processing proceeds to step S3 to thereby make a decision on effectiveness.

If neither a line to be ignored, nor invalid definition exists during a branching processing in step S4, the processing proceeds to step S5 to refer to a common menu, and if the common menu does not exist, the processing proceeds to step S6 to add an individual menu item.

Further, the processing proceeds to step S8 via a branching processing in step S7, in the step S8, the case where either the line to be ignored, or the invalid definition exists during the branching processing in the step S4 being inputted, and thereafter, the processing reverts to the step of making a decision on the next line as in the step S2. If the next line exists, the processing via this loop is repeated to be completed in step 9 when the next line disappears. If the common menu exists in the branching processing in the step S5, the processing proceeds to step S10 to read the common menu. If the next line exists in the common menu definition as read in the step S10 during a branching processing in step S11, the processing proceeds to step S12 to make a decision on effectiveness. If neither the line to be ignored, nor the invalid definition exists during a branching processing in step S13, the processing proceeds to step S14 to add a common menu item. Further, the processing proceeds to step S15 where the case where either the line to be ignored, or the invalid definition exists during the branching processing in the step S13 is inputted, and thereafter, the processing reverts to the step of making a decision on the next line as in the step 11.

If the next line exists in the step of making the decision on the next line as in the step S11, this loop is repeated, and the processing proceeds to the branching processing in the step S7 when the next line disappears, thereby reverting to the routine of the construction processing of an individual menu.

Thus, with the processing for displaying the right click menu screen, there is adopted a flow whereby the contents of the individual menu definition are successively interpreted, and upon detection of a reference to the common menu at a midpoint, the common menu file is opened to thereby interpret the contents thereof, reverting to processing for interpretation of the original individual menu definitions upon completion of the above-mentioned.

Now, there are described hereinafter checking of the effectiveness of the individual menu definition executed in the step S3, and checking of the effectiveness of the common menu definition executed in the step S12. In this processing, the following decisions are executed against respective lines (record) in a CSV file. The decisions are basically pursuant to the rule of the definition of the CSV format of RFC4180.

1. Lines to be Ignored

The following lines contained in the individual menu definition files, and the common menu definition file, respectively, are ignored:
   a blank line, or a line with white space only
   comment (including a line with "#" prefixed thereto, and a line with white space preceding "#")
However, the context of the line ignored is secured.

2. Invalid Definition

The following lines of the individual menu definition files, and the common menu definition file, respectively, are regarded as invalid definition to be thereby ignored:
   record (a blank line is ignored) described in a format not based on RFC4180
   record containing a line feed (CRLF or LF) in a character string column
   record where the number of columns is other than 3
   record where a first column is not at an effective value (0 to 2)
   record where a second column is only a blank line, or a line with white space only
   record defined at the head of a file, having a first column at 2, and records successively defined thereafter, having a first column at 2
   in the case of a record immediately preceding records where a first column is at 2 having a first column at 0, and records successively defined thereafter, having a first column at 2
   in the case of a record immediately preceding records where a first column is at 2 having a first column at 1, and invalid definition, and records successively defined thereafter, having a first column at 2
   a line (a common definition portion of a common menu definition file) in the common definition file, having a first column (hierarchy) at 0

As described in the foregoing, a highly-flexible right click menu structure according to the present invention is combined with a related-art fixed-type menu structure to thereby enable only necessary part of an individual right click menu to be expanded.

By so doing, it is possible to additionally define only definition related to a necessary object name without preparing the individual menu definitions related to all the objects, respectively, so that the number of steps necessary for definition can be substantially cut back.

In addition, a plurality of operation monitoring stations are enabled to refer to a common menu by placing a folder for storing menu definition files in a server on a network, and by making a shortcut reference to the folder. By so doing, it is possible to eliminate the need for executing file-copying to the operation monitoring stations.

With the present invention, the following advantageous effects can be expected.

(1) It is possible to display right click menus completely different in configuration from each other according to a select object.

(2) Since data is structured simply, and through intuition, menu definition can be described by use of a text editor, and a general-purpose spreadsheet software. Further, because of a simple data-structure, even an end-user is able to easily execute addition/correction of menu definition on an object-by-object basis.

(3) Since all menu definition data are managed under only a specified folder, the present invention can be easily applied to a plurality of units of operation monitoring apparatuses simply by copying of a management folder.

(4) For the retrieval means against the individual menu definition file, or the common menu definition file, use can be made of the standard file system mounted on the operating system, and there is no need for using a particular software, so that a system can be realized at a low cost.

(5) Since the common menu definition is shared between definitions identical in menu structure to each other, it is possible to reduce a maintenance cost as well as a construction cost of the individual menu definition files for massive numbers of objects.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. An operation monitoring apparatus of a process control system comprising:
   an object file holding means for holding a plurality of individual menu definition files each separately registered under unique object names, respectively, each having menu items defined on an object-by-object basis, in an object displayed on an operation-monitoring screen, the object being a target for display on a right click menu screen;
   a retrieval means for acquiring information on the object name of the object subjected to right click on the operation-monitoring screen, and retrieving the object file holding means, thereby extracting the individual menu definition file registered under the object name; and
   a screen display means for acquiring information on the individual menu definition file as extracted, and displaying the right click menu screen on the operation-monitoring screen,
   wherein the individual menu definition file is unique to the target object, and the target object is a data file,
   wherein the object file holding means holds a common menu definition file in common with a plurality of objects as targets for display on the right click menu screen,
   wherein the common menu definition file is registered under a file name that has a unique identification data, the file name is embedded and described in the individual menu definition file, and the retrieval means extracts the common menu definition file on the basis of the file name, and
   wherein the right click menu screen is modifiable by editing the common menu definition file.

2. The operation monitoring apparatus according to claim 1, wherein the individual menu definition file, and the common menu definition file each are provided with a hierarchical structure for displaying submenus.

3. The operation monitoring apparatus according to claim 1, wherein the individual menu definition file, and the common menu definition file each are described in the form of a CSV file comprising three columns including hierarchy, menu display item, and execution command definition.

4. The operation monitoring apparatus according to claim 3, wherein the CSV file is described in the form of a CSV extension being affixed to an object name, or identification data of a common menu definition file.

5. The operation monitoring apparatus according to claim 1, wherein retrieval by the retrieval means is executed by use of a standard file system mounted on an operating system.

6. The operation monitoring apparatus according to claim 1, wherein effectiveness of the individual menu definition file, and the common menu definition file, respectively, are checked according to a specified rule at the time of interpretation of menu definition.

* * * * *